US006201809B1

(12) United States Patent
Lewin et al.

(10) Patent No.: US 6,201,809 B1
(45) Date of Patent: Mar. 13, 2001

(54) PORT REDUNDANCY AND BACKPRESSURE TRANSLATION TABLE APPARATUS

(75) Inventors: Amit Lewin, Tel Aviv; Tal Keren Zvi, Rosh Ha'ayin, both of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/086,245

(22) Filed: May 28, 1998

(51) Int. Cl.[7] .................................................. H04L 12/66
(52) U.S. Cl. ........................ 370/392; 370/395; 370/401; 370/466
(58) Field of Search ..................... 370/388, 389, 370/390, 400, 401, 235, 397, 352, 392; 709/239; 455/5.1

(56) References Cited

U.S. PATENT DOCUMENTS

| 5,410,343 |   | 4/1995  | Coddington et al. ............... 348/7 |
| 5,506,840 | * | 4/1996  | Pauwels et al. ..................... 370/60.1 |
| 5,689,500 | * | 11/1997 | Chiussi et al. ...................... 370/235 |
| 5,689,505 | * | 11/1997 | Chiussi et al. ...................... 370/388 |
| 5,689,506 | * | 11/1997 | Chiussi et al. ...................... 370/388 |
| 5,708,659 | * | 1/1998  | Rosterker et al. .................. 370/392 |
| 5,784,683 | * | 7/1998  | Sistanizadeh et al. .............. 455/5.1 |
| 5,790,548 |   | 8/1998  | Sistanizadeh et al. .............. 370/401 |
| 5,951,651 | * | 9/1999  | Lakshman et al. ................. 709/239 |

* cited by examiner

*Primary Examiner*—Dang Ton
*Assistant Examiner*—Anthony Ton
(74) *Attorney, Agent, or Firm*—Howard Zarotsky; David J. Weitz; Wilson Sonsini Goodrich & Rosati

(57) ABSTRACT

A translation table apparatus used to perform both forward and backward bitmap vector translations. The translation table is used with bit vectors where it is desired to displace one or more bits to different bit positions in accordance with a configurable bitmap translation table. The translation of one bit vector to another is performed in real time and any number of bits can be moved simultaneously. In addition, both the bit vectors and the contents of the translation table can be changed on the fly. Translations are performed on multiple bits simultaneously wherein several bits can be displaced at the same time in accordance with the translation table. The same hardware used to implement the translation table is used for backward translations as well.

10 Claims, 4 Drawing Sheets

PORT REDUNDANCY AND BACKPRESSURE TRANSLATION TABLE APPARATUS

FIELD OF THE INVENTION

The present invention relates generally to data communications equipment and more particularly relates to a port redundancy/backpressure translation table apparatus.

BACKGROUND OF THE INVENTION

More and more reliance is being placed on data communication networks to carry increasing amounts of data. In a data communications network, data is transmitted from end to end in groups of bits which are called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from a source to a destination. Alternatively, the application may wish to send the data unit to multiple destinations.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet. Intranet and Residential Broadband Services and Applications," Timothy Kwok, Prentice Hail, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Cell Processing at the Ingress

A typical ATM switch comprises a plurality of port interface cards coupled to the ingress of a switching fabric. The egress of the switch is also coupled to a port interface card. The functions of the interface card includes translation from optical signal to electrical, performing error checking on the received cells, etc. The interface card also comprises a cell processor one of whose major functions is to determine the appropriate output destination port for each incoming cell. The cell processor makes this determination based on the destination ATM address in the received cell and on the contents of a lookup table (LUT). The LUT comprises destination entries for many possible VPI/VCI combinations.

As an example, the entry retrieved from the LUT can be used to generate a routing tag for the cell. The cell is then passed to the switching fabric which functions to steer the cell to the appropriate destination. Note that for a unicast cell, the routing tag has only a single destination port selected. For a multicast (MC) cell, however, the routing tag may have a plurality of destination ports indicated.

Currently, there is increasing concern over the reliability of networks including both the switches and the links used to connect them. As the amount and importance of the data traffic sent over networks increases, the reliability of networks become more and more important. When a link fails, it is desirable to have a redundancy capability within the switch which can provide recovery in the event of a port or link failure. When a port or link in a switch fails, a backup port can be assigned in its place. The original routing tag, however, remains unchanged as it is impractical to modify the contents of the LUT. The LUT typically contains a large number of entries, e.g., tens of thousands, wherein any combination of entries may contain the failed port.

One solution is to utilize a memory lookup table that contains the mappings from the old output ports designations to the new one. Access to the lookup table occurs in serial fashion which greatly slows down the process. Large time delays are generated as the number of parallel output port designations increases, e.g., multicast cells wit h large numbers of destinations.

Thus, a mechanism is needed to modify the routing tag before the cell is transferred to the switching fabric. The mechanism should preferably handle both unicast and multicast cells without incurring significant time delays.

SUMMARY OF THE INVENTION

The present invention comprises a translation table that can serve as both a forward translation table and as a backward translation table. The translation table can be used with bit vectors where it is desired to displace one or more bits to different bit positions in accordance with a configurable bitmap translation table. The translation of one bit vector to another can be performed in real time. Any number of bits can be moved simultaneously. In addition, both the bit vectors and the contents of the translation table can be changed on the fly. In practice, the translation table is typically more static that the bit vectors but the invention is not limited to this case. The translation table is accessible by a host application.

A typical application of the present invention includes a switch wherein the information units, e.g., frames, cells, etc., are queued at the ingress of the switch in accordance with their output destination ports. Each data unit has associated with it a routing tag which is a bitmap vector representing the output ports of a switch to which the data units are destined to.

Now assume, for example, that due to a link or port failure, the traffic originally destined to output port J is to be diverted to output port K. In this case, the bitmap representing the destination output ports should be modified such that when a data unit arrives with destination output port J selected, the translation table can be configured so as to inhibit traffic to port J and instead divert it to output port K. Note that the selection of an output port is indicated in the bitmap vector, i.e., routing tag, as a '1'. A '0' indicates that the output port is not selected. Thus, to divert traffic from one port to another, the bit corresponding to the output port to be inhibited is set to a '0' and the bit corresponding to the output port to receive the traffic is set to a '1'.

It is an important feature of the present invention that the above described operation can be performed on multiple bits simultaneously, i.e., several bits can be displaced at the same time in accordance with the translation table.

For example, assume that a multicast stream of data is destined to output ports K, L and M. In addition, assume that output ports K and M have failed. It is desirable to divert the traffic originally destined to output ports K and M to a redundant backup output port. Ports R and S as selected as the redundant output ports for failed output ports K and M, respectively. The displacement of the bits to select both redundant ports can be performed simultaneously in accordance with the translation table.

It is an important feature of the present invention that the translation table can be utilized to perform both forward and backward translations. The same hardware used to implement the translation table can be used for backward translations as well. To illustrate, suppose bit M which was originally set to '1', is displaced by the translation table to bit N. Applying the resulting vector to the translation table in a backward (or inverse) manner yields the original vector wherein bits M and N are set to '1'.

One application of backward translations is described in connection with the example described above wherein traffic is diverted from output port J to output port K. Suppose that output port K is congested and it is desired to issue a backpressure indication towards the ingress of the switch in order that traffic be inhibited to output port K. The same translation table can be used to determine all the original output ports that diverted traffic to a particular output port. Here too, more than one backpressure bit can be set. Backpressure bits to a multiple of output ports can be generated simultaneously.

The backpressure information is represented by a bitmap as is the case with the routing tag. The backpressure bitmap is translated, however, in the backward (inverse) direction. For example, bit K, which corresponds to output port K, relates to both output queues K and J at the ingress.

There is thus provided in accordance with the present invention a translation apparatus for use in a networking device comprising a first bitmap vector of length N bits wherein one or more bits may be set at the same time, a second bitmap vector of length N bits wherein one or more bits may be set at the same time, a translation matrix having dimensions N×N, the contents of the translation matrix simultaneously representing a forward transformation and a backward transformation, first logic circuitry adapted to apply the first bitmap vector to the translation matrix to yield a third bitmap vector via the forward transformation, the first logic circuitry adapted to apply the forward transformation to all bits of the first bitmap vector simultaneously, second logic circuitry adapted to apply the second bitmap vector to the translation matrix to yield a fourth bitmap vector via the backward transformation, the second logic circuitry adapted to apply the backward transformation to all bits of the second bitmap vector simultaneously, wherein the first logic circuitry and the second logic circuitry apply the forward transformation and the backward transformation simultaneously and wherein N is a positive integer.

The first bitmap vector comprises an original routing tag, the second bitmap vector comprises original backpressure information and the first logic circuitry comprises routing logic circuitry. The second logic circuitry comprises backpressure logic circuitry and the third bitmap vector comprises a new routing tag. In addition, the fourth bitmap vector comprises new backpressure information.

Also, one or more bits of the first bitmap vector and tie second bitmap vector can be set and translated simultaneously via the forward and backward transformations, respectively. The first logic circuitry comprises means for performing a bit by bit logical AND between the contents of the first bitmap vector and a column 'i' of the translation matrix followed by a logical OR of the resultant products.

The second logic circuitry comprises means for performing a bit by bit logical AND between the contents of the second bitmap vector and a row 'j' of the translation matrix followed by a logical OR of the resultant products.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| BP | bitmap vector (backpressure information) that is to be backward translates by the matrix |
| BP-T | bitmap vector representing the backward translated backpressure information |
| CCITT | Comite Consulatif International Telegraphique et Telephonique |
| FDDI | Fiber Distributed Data Interface |
| IP | Internet Protocol |
| ITU | International Communications Union |
| LUT | Lookup Table |
| MC | Multicast |
| N | the length of the bitmap vectors and the dimension of the translation table matrix |
| RT | bitmap vector (routing tag) that is to be forward translated by the matrix |
| RT-T | bitmap vector representing the forward translated routing tag |
| TCP | Transmission Control Protocol |
| TT | translation table matrix |

-continued

| Term | Definition |
|---|---|
| UNI | User to Network Interface |
| VCI | Virtual Circuit Indicator |
| VPI | Virtual Path Indicator |

General Description

Figure 1:
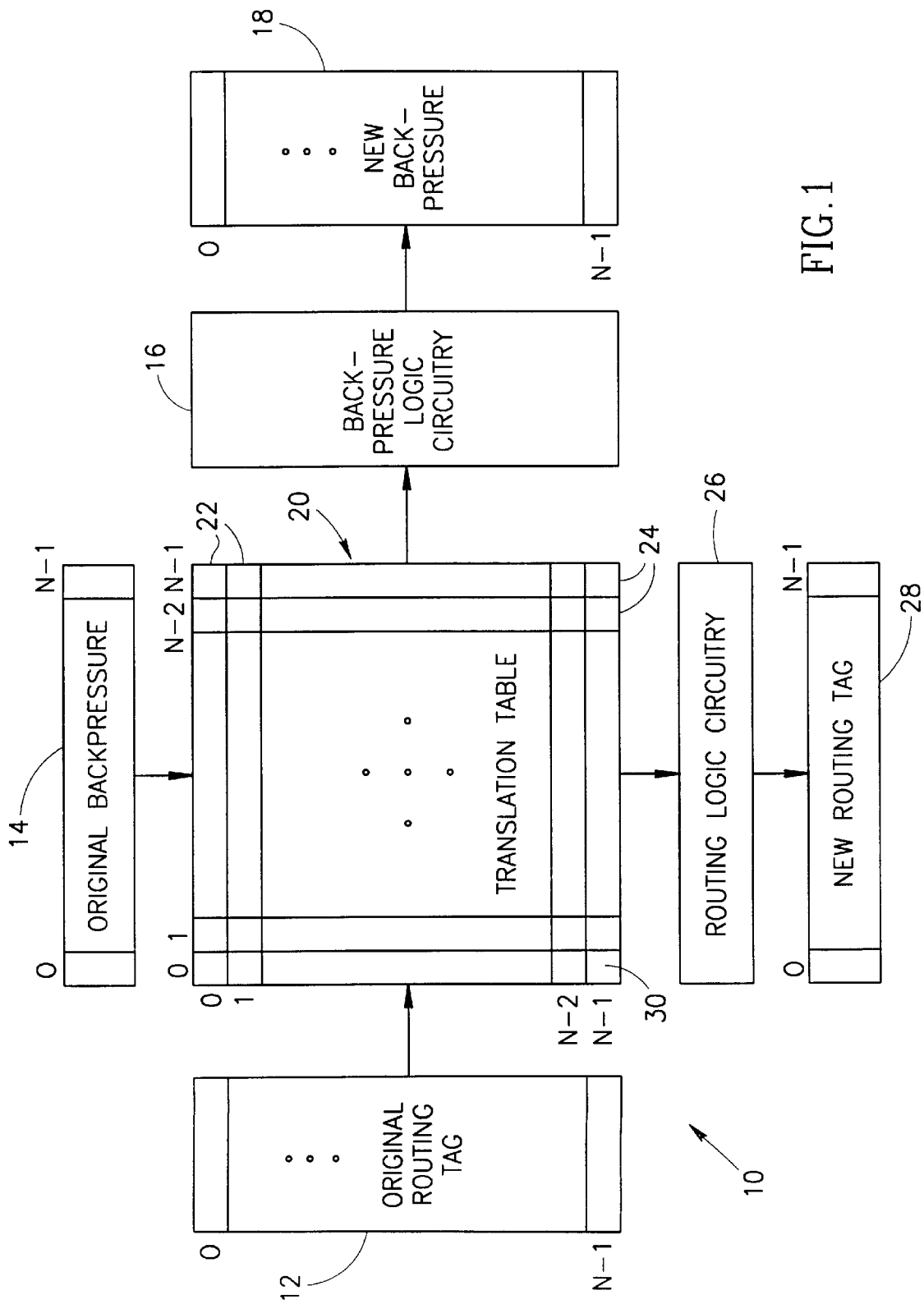
FIG. 1 is a block diagram illustrating a translation table for generating a new routing tag and backpressure information constructed in accordance with the present invention.

A block diagram illustrating a translation table for generating a new routing tag and backpressure information constructed in accordance with the present invention is shown in FIG. 1, The translation apparatus, generally referenced 10, comprises a bitmap translation table 20 which is implemented as a square matrix of a plurality of registers 30, e.g., flip flops, wherein the dimension of the matrix is the same as the length of the bitmap vectors that are applied to the translation table. To illustrate the principles of the present invention, the description is given using the example of a routing tag and backpressure information. This example has applications in various types of network switching equipment such as ATM, frame relay, Ethernet, etc. One skilled in the art could easily apply the principles of the present invention to other applications as well.

The original routing tag 12 comprises a register of length N bits used to hold the routing tag of the original selection of output ports for a data unit, i.e., cell, before being translated so as to take into consideration redundancy to compensate for output port or link failures. The original backpressure information 14 comprises a register of N bits which is used to hold the backpressure information before taking into consideration failed ports or links.

The translation table 20 comprises N rows 22 from 0 through N−1. Similarly, the translation table comprises N columns 24 from 0 through N−1. Routing logic circuitry 26 applies the contents of the translation table in a forward manner on the original routing tag 12 to yield a new routing tag 28 also comprising N bits. Similarly, the backpressure logic circuitry 16 applies the translation table in a backward or inverse manner to the original backpressure information to yield a new backpressure information 18 comprising N bits.

When there is to be no displacement of bits in the routing tag, i.e., no port or link failures, the translation table comprises a '1' in each bit along the diagonal running from (0, 0) to (N−1, N−1). In this case, the resulting new routing tag is identical to the original routing tag.

When a particular bit is to be displaced, e.g., a port failure has occurred, its corresponding bit on the diagonal is set to '0' and another bit corresponding to the redundant port (the new position) is set to '1'. As an example, suppose bit M (corresponding to output port M) in the original routing tag is to be displaced to bit P (corresponding to redundant port P). Then the diversion of traffic is accomplished by clearing bit (M, M), i.e., setting the bit to '0', in the translation table and setting bit (M, P) to '1'. Note that matrix entry indices are given in (row, column) format.

Figure 2:
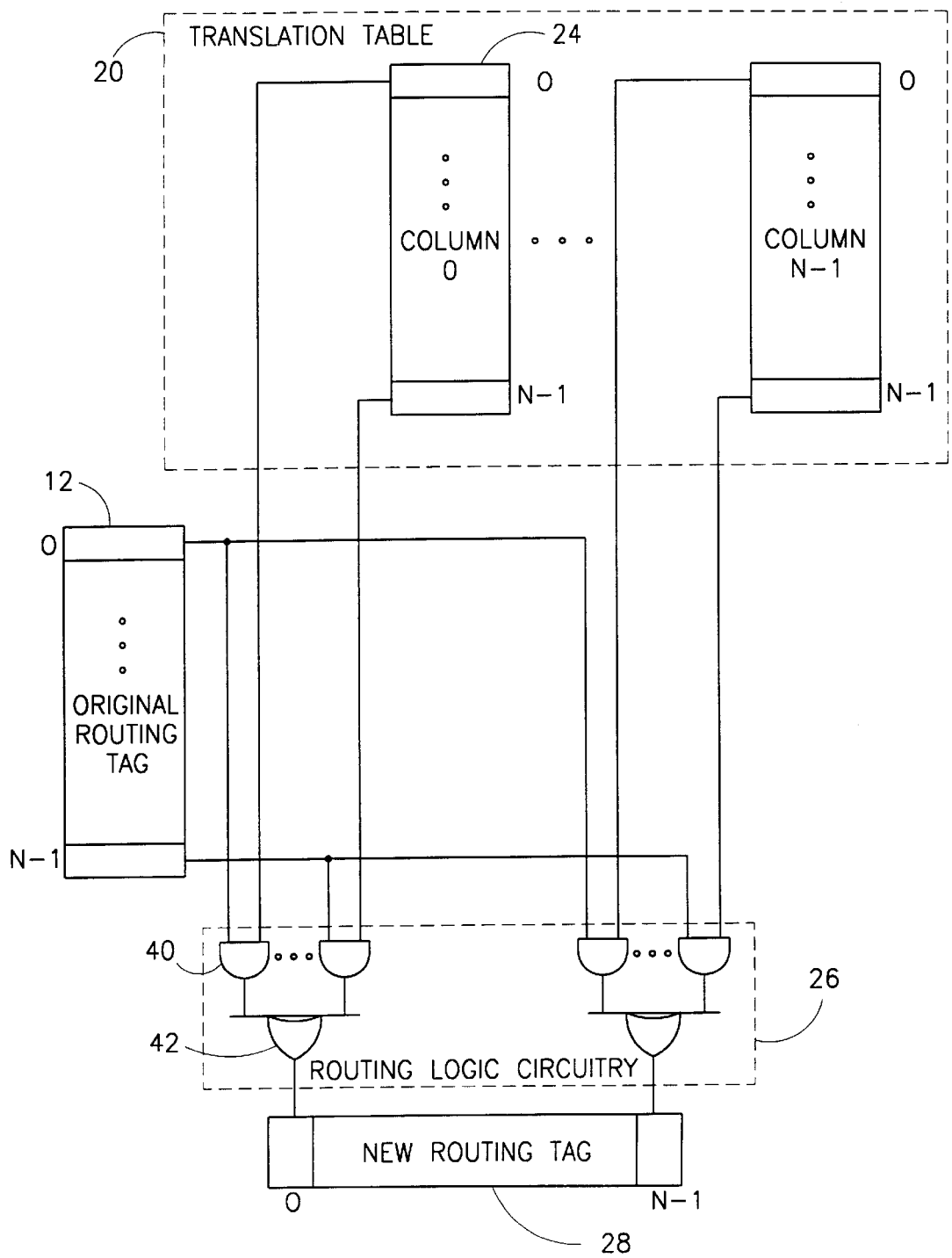
FIG. 2 is a block diagram illustrating the translation table and routing logic circuitry in more detail.

As described previously, the translation table can be used to perform forward and backward translations. The routing logic circuitry is used to perform the forward translation. A block diagram illustrating the translation table and routing logic circuitry in more detail is shown in FIG. 2. Each of the N bits in the original routing tag 12 is logically ANDed with each corresponding bit in each column 24 of the translation table 20 via AND gates 40, The output of each group of AND gates is ORed via OR gates 42 to yield a new bit in the new routing tag 28. For example, bit 0 in the new routing tag is generated by first ANDing bits 0 through N−1 of the original routing tag with corresponding bits 0 through N−1 of the 0th column and then ORing together the products output by the AND gates.

The operation of routing logic circuitry is represented by equation 1 below.

$$RT\text{-}T(i)=[RT(0) \text{ AND } TT(i,0)] OR \ldots OR [RT(N-1) \text{ AND } TT(i,N-1)] \quad (1)$$

Bit 'i' of vector RT−T is generated as a result of the bit by bit logical AND between vector RT and column 'i' of the matrix TT followed by the logical OR operation of the resultant product of the previous AND operation.

Figure 3:
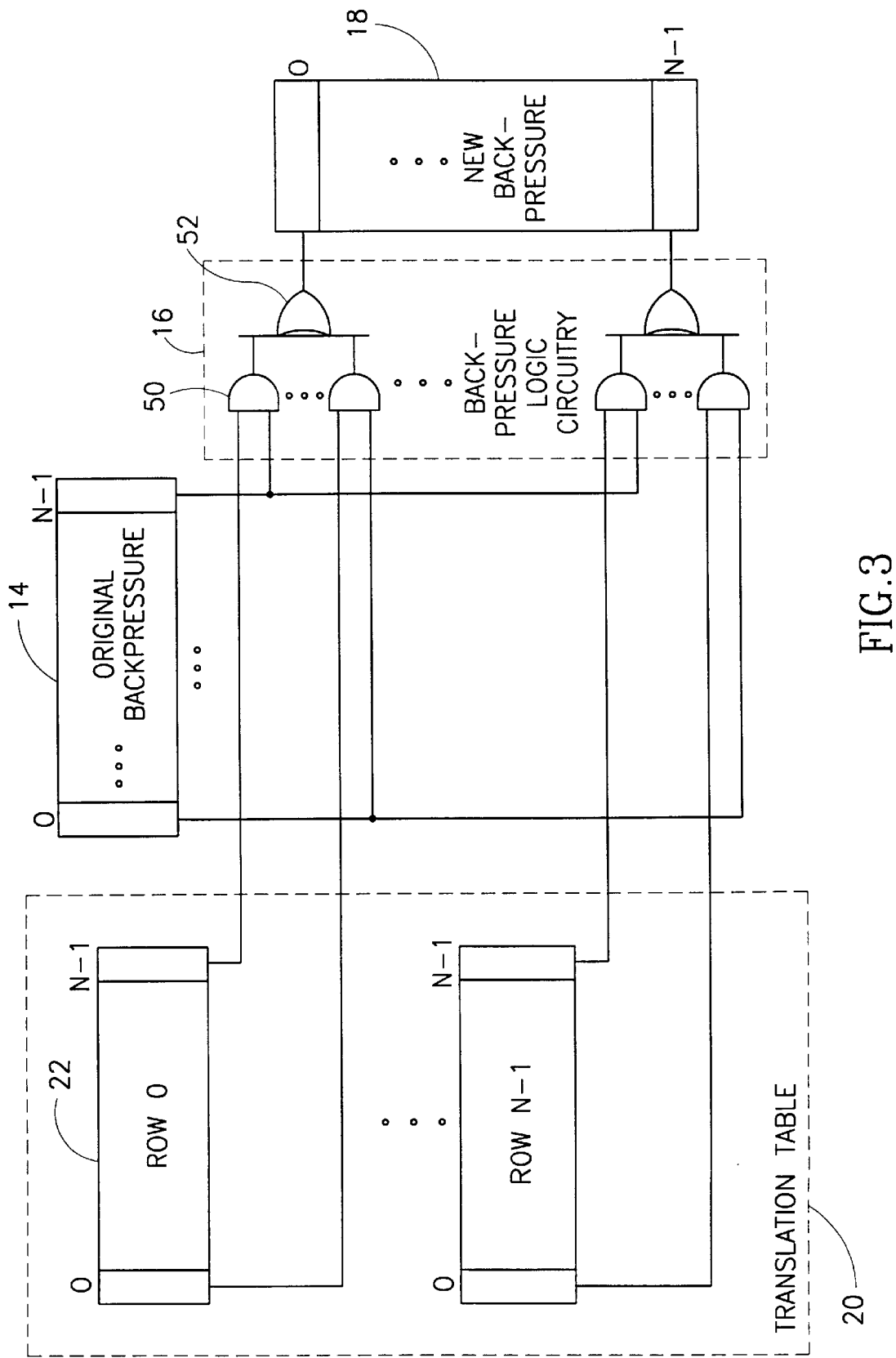
FIG. 3 is a block diagram illustrating the translation table and backpressure logic circuitry in more detail.

A block diagram illustrating the translation table and backpressure logic circuitry in more detail is shown in FIG. 3. Each of the N bits in the original backpressure information 14 is logically ANDed with each corresponding bit in each row 22 of the translation table 20 via AND gates 50.

The output of each group of AND gates is ORed via OR gates 52 to yield a new bit in the new backpressure information 18. For example, bit 0 in the new backpressure information is generated by first ANDing bits 0 through N−1 of the original backpressure information with corresponding bits 0 through N−1 of the 0th row and then ORing together the products output by the AND gates.

The operation of backpressure logic circuitry is represented by equation 2 below.

$$SP\text{-}T(i)=[BP(0) \text{ AND } TT(0,i)] OR \ldots OR [BP(N-1) \text{ AND } TT(N-1,i)] \quad (2)$$

Bit 'i' of vector BP−T is generated as a result of the bit by bit logical AND between vector SP and column 'i' of the matrix TT 20 followed by the logical OR operation of the resultant product of the previous AND operation.

Figure 4:
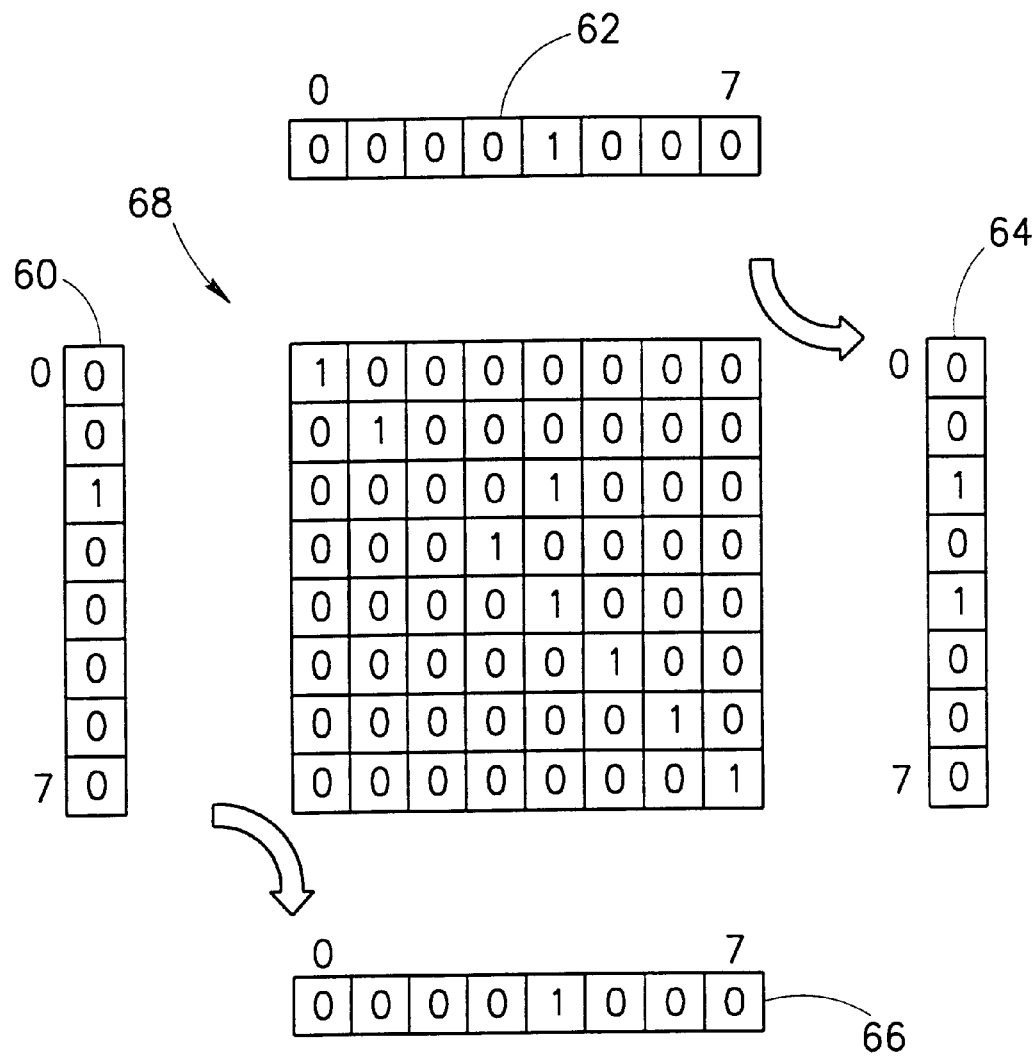
FIG. 4 is a diagram illustrating an example 8×8 translation table wherein a failed port is redirected to a redundant port.

A diagram illustrating an example 8×8 translation table wherein a failed port is redirected to a redundant port is shown in FIG. 4. In this example, presented to illustrate the principles of the present invention, the switch comprises 8 output ports as represented by the 8 bit original routing tag bitmap vector RT 60. In addition, the original backpressure information vector comprises an 8 bit vector BP 62. In this example, it is assumed that destination output port #2 failed and port #4 is used as a backup destination output port for the failed port #2.

Therefore, for all ports other than port #2, the translation table matrix TT 68 comprises a diagonal of ones (set flip flops) from the (0, 0) bit to the (7, 7) bit. This means that the original output port remains unchanged in the new output port after the translation. If bit #2 was set in the original routing tag RT 60 then the translated bitmap vector RT−T 66 comprises a '1' in port #4, the redundant output port, rather than in port #2.

The routing logic circuitry functions to multiply the original routing tag bitmap vector RT bit by bit by the 8 bits of the column of the matrix TT corresponding to the required bit (column #2 in this example). Subsequently, a logic OR operation is performed on the 8 AND products. Thus, it either bit #2 or bit #4 in the original routing tag bitmap vector RT are set then the resulting bit #4 in the new routing tag bitmap vector RT−T will be set as well.

Note that the example presented herein is for a unicast cell. A multicast cell may have ore than one bit set in both the original and new routing tags.

For backpressure information translation, the same translation table matrix 68 is utilized. Here, however, instead of multiplying the original vector by the columns of the matrix, the original vector is multiplied by the rows of the matrix. The backpressure bitmap vector is generated at the egress of the switch. The vector is projected onto the appropriate queues at the ingress, where the output queues reside.

In this example, the backpressure information is translated by the matrix to determine the original output ports corresponding to the output ports that are congested. If port #4 is congested, then traffic destined to both ports #2 and #4 should be inhibited. Thus, the original backpressure bitmap vector BP 62 has bit #4 set indicating backpressure on output port #4. After translation by the matrix TT, the new backpressure bitmap vector BP-T 64 has both bits #2 and #4 set to '1' indicating that traffic originally destined to either ports #2 or #4 should be inhibited.

The backpressure logic circuitry functions to multiply the original backpressure bitmap vector BP bit by bit by the 8 bits of the row of the matrix TT corresponding to the required bit (rows #2 and #4 in this example), Subsequently, a logic OR operation is performed on the 8 AND products. Thus, if bit #4 in the original backpressure bitmap vector BP is set then the resulting bits #2 and #4 in the new backpressure information bitmap vector BP-T will be set as well.

Note that this example is for the case when a single bit is set in the backpressure information. Multiple bits set in the backpressure information are handled in the same manner with no time delay or processing penalty. In the multicast case, the original RT vector may have multiple bits set. In addition, multiple backpressure information bits may be set simultaneously.

In addition, although an example is presented for a switch with 8 output ports, the translation table apparatus of the present invention can be scaled or up or down to accommodate any number of output ports.

While the invention has been described with respect to a limited number of embodiments, it will be appreciated that many variations, modifications and other applications of the invention may be made.

What is claimed is:

1. A translation apparatus for use in a networking device, comprising:

a first bitmap vector of length N bits wherein one or more bits may be set at the same time;

a second bitmap vector of length N bits wherein one or more bits may be set at the same time;

a translation matrix having dimensions N×N, the contents of said translation matrix simultaneously representing a forward transformation and a backward transformation;

a first logic circuitry adapted to apply said first bitmap vector to said translation matrix to yield a third bitmap vector via said forward transformation, said first logic circuitry adapted to apply said forward transformation to all bits of said first bitmap vector simultaneously;

a second logic circuitry adapted to apply said second bitmap vector to said translation matrix to yield a fourth bitmap vector via said backward transformation, said second logic circuitry adapted to apply said backward transformation to all bits of said second bitmap vector simultaneously;

wherein said first logic circuitry and said second logic circuitry apply said forward transformation and said backward transformation simultaneously; and wherein N is a positive integer.

2. The apparatus according to claim 1, wherein said first bitmap vector comprises an original routing tag.

3. The apparatus according to claim 1, wherein said second bitmap vector comprises original backpressure information.

4. The apparatus according to claim 1, wherein said first logic circuitry comprises routing logic circuitry.

5. The apparatus according to claim 1, wherein said second logic circuitry comprises backpressure logic circuitry.

6. The apparatus according to claim 1, wherein said third bitmap vector comprises a new routing tag.

7. The apparatus according to claim 1. wherein said fourth bitmap vector comprises new backpressure information.

8. The apparatus according to claim 1, wherein one or more bits of said first bitmap vector and said second bitmap vector can be set and translated simultaneously via said forward and backward transformations, respectively.

9. The apparatus according to claim 1, wherein said first logic circuitry comprises means for performing a bit by bit logical AND between the contents of said first bitmap vector and a column 'i' of said translation matrix followed by a logical OR of the resultant products.

10. The apparatus according to claim 1, wherein said second logic circuitry comprises means for performing a bit by bit logical AND between the contents of said second bitmap vector and a row 'j' of said translation matrix followed by a logical OR of the resultant products.

* * * * *